United States Patent [19]
Kagiyama et al.

[11] Patent Number: 5,620,373
[45] Date of Patent: Apr. 15, 1997

[54] TORQUE VARIATION ABSORBING DEVICE

[75] Inventors: Junji Kagiyama; Masakazu Kamiya, both of Toyoake, Japan

[73] Assignee: Aisin Seiki Kabushiki Kaisha, Kariya, Japan

[21] Appl. No.: 324,462

[22] Filed: Oct. 17, 1994

Related U.S. Application Data

[63] Continuation of Ser. No. 31,904, Mar. 16, 1993, abandoned.

[30] Foreign Application Priority Data

Mar. 18, 1992 [JP] Japan ..................................... 4-062205

[51] Int. Cl.⁶ ....................................................... F16D 3/14
[52] U.S. Cl. ............................................ 464/68; 192/212
[58] Field of Search ................... 464/66, 68; 192/110 B, 192/212

[56] References Cited

U.S. PATENT DOCUMENTS

| | | | |
|---|---|---|---|
| 4,220,233 | 9/1980 | Ban et al. | 192/106.2 |
| 4,732,250 | 3/1988 | Maucher et al. | 192/70.17 |
| 4,782,933 | 11/1988 | Jäckel et al. | 192/110 B X |
| 4,890,710 | 1/1990 | Reik et al. | 464/68 X |
| 5,146,811 | 9/1992 | Jäckel et al. | 464/68 X |
| 5,176,233 | 1/1993 | Woerner et al. | 464/68 X |
| 5,249,659 | 10/1993 | Fukushima | 464/68 X |

FOREIGN PATENT DOCUMENTS

| | | | |
|---|---|---|---|
| 2826275 | 12/1978 | Germany. | |
| 3447925 | 1/1986 | Germany. | |
| 3502229 | 7/1986 | Germany. | |
| 64-48448 | 3/1989 | Japan. | |
| 2160296 | 12/1985 | United Kingdom | 464/64 |
| 2170295 | 7/1986 | United Kingdom. | |

*Primary Examiner*—Daniel P. Stodola
*Assistant Examiner*—Eileen A. Dunn
*Attorney, Agent, or Firm*—Burns, Doane, Swecker & Mathis, LLP

[57] ABSTRACT

A torque variation absorbing device comprises a drive body for connecting to a drive member, a driven body for connecting to a clutch mechanism, a damping mechanism disposed between the drive body and the driven body, a hysteresis mechanism disposed between the drive body and the driven body and including an elastic member, and a bearing disposed between the drive body and the driven body and including an inner race and an outer race, wherein any one of the inner race and the outer race is pressed by an elastic force of the elastic member in the direction of the drive member from the side of the clutch mechanism.

13 Claims, 2 Drawing Sheets

TORQUE VARIATION ABSORBING DEVICE

This application is a continuation of application Ser. No. 08/031,904, filed Mar. 16, 1993, now abandoned.

BACKGROUND OF THE INVENTION

1. Field of the Invention

This invention relates to a torque variation absorbing device for use in a driving axle system.

2. Description of the Related Art

A conventional torque variation absorbing device is disclosed in the Japanese Utility Model Laid Open No. 64-48448 published in 1989 without examination. In FIG. 2 the torque variation absorbing device comprises a drive plate 2 which is connected to a crank shaft 14 by a plurality of bolts 14a and a flywheel 3 including a surface 3a on which a clutch mechanism (not shown in the Figure) is mounted. The torque variation absorbing device comprises a plurality of damping mechanisms 12 disposed between the drive plate 2 and the flywheel 3, and each of the damping mechanisms 12 includes a torsion spring 13. The torque variation absorbing device comprises a driven plate 5 fixed to the flywheel 3 by a plurality of bolts 4, a hub 7 connected to the drive plate 2 by a plurality of screws 6 and a bearing 8 provided between the driven plate 5 and the hub 7. Furthermore the torque variation absorbing device possesses a friction member 9, a thrust plate 10 and a cone spring 11. An outer race 8a of the bearing 8 is pressed by the elastic force of the cone spring 11 in the direction of the clutch mechanism from the side of the crank shaft 14 through the driven plate 5.

When the clutch mechanism is released, a pressure plate (not shown in Figure) in the clutch mechanism is pressed in the direction from the right as seen in FIG. 2 and the surface 3a of the flywheel 3 receives the reaction force from the clutch mechanism. Therefore the flywheel 3 presses the cone spring 11 in the direction of the crank shaft 14 from the side of the clutch mechanism through the outer race 8a and the driven plate 5 against the elastic force of the cone spring 11. The flywheel 3 is moved a distance equaling the sum of a gap between a ball 8c and the outer race 8a and a gap between the ball 8c and the inner race 8b in the direction of the crank shaft 14 from the side of the clutch mechanism. Consequently the play of a clutch pedal increases upon the releasing of the clutch mechanism, and the initial stroke of the clutch pedal for releasing the clutch mechanism lengthens.

SUMMARY OF THE PRESENT INVENTION

It is an object of the present invention to provide a torque variation absorbing device which prevents the initial stroke of the clutch pedal for releasing the clutch mechanism from lengthening.

It is another object of the present invention to provide a torque variation absorbing device possessing a simple structure and a small size.

It is a further object of the present invention to provide a torque variation absorbing device which can be constructed at a low cost.

It is a further object of the present invention to provide a torque variation absorbing device which can be constructed easily.

To achieve the above mentioned objects, this invention provides a torque variation absorbing device comprising: a drive body for connecting to a drive member, a driven body for connecting to a clutch mechanism, a damping mechanism disposed between the drive body and the driven body, a hysteresis mechanism disposed between the drive body and the driven body and including an elastic member, add a bearing disposed between the drive body and the driven body and including an inner race and an outer race, wherein any one of the inner race and the outer race is pressed by an elastic force of the elastic member in the direction of the drive member from the side of the clutch mechanism.

BRIEF DESCRIPTION OF THE DRAWINGS

The features and advantages of the torque variation absorbing device according to the present invention will be more clearly appreciated from the following description in conjunction with the accompanying drawings wherein.

DETAILED DESCRIPTION OF A PREFERRED EMBODIMENT OF THE INVENTION

Figure 1:
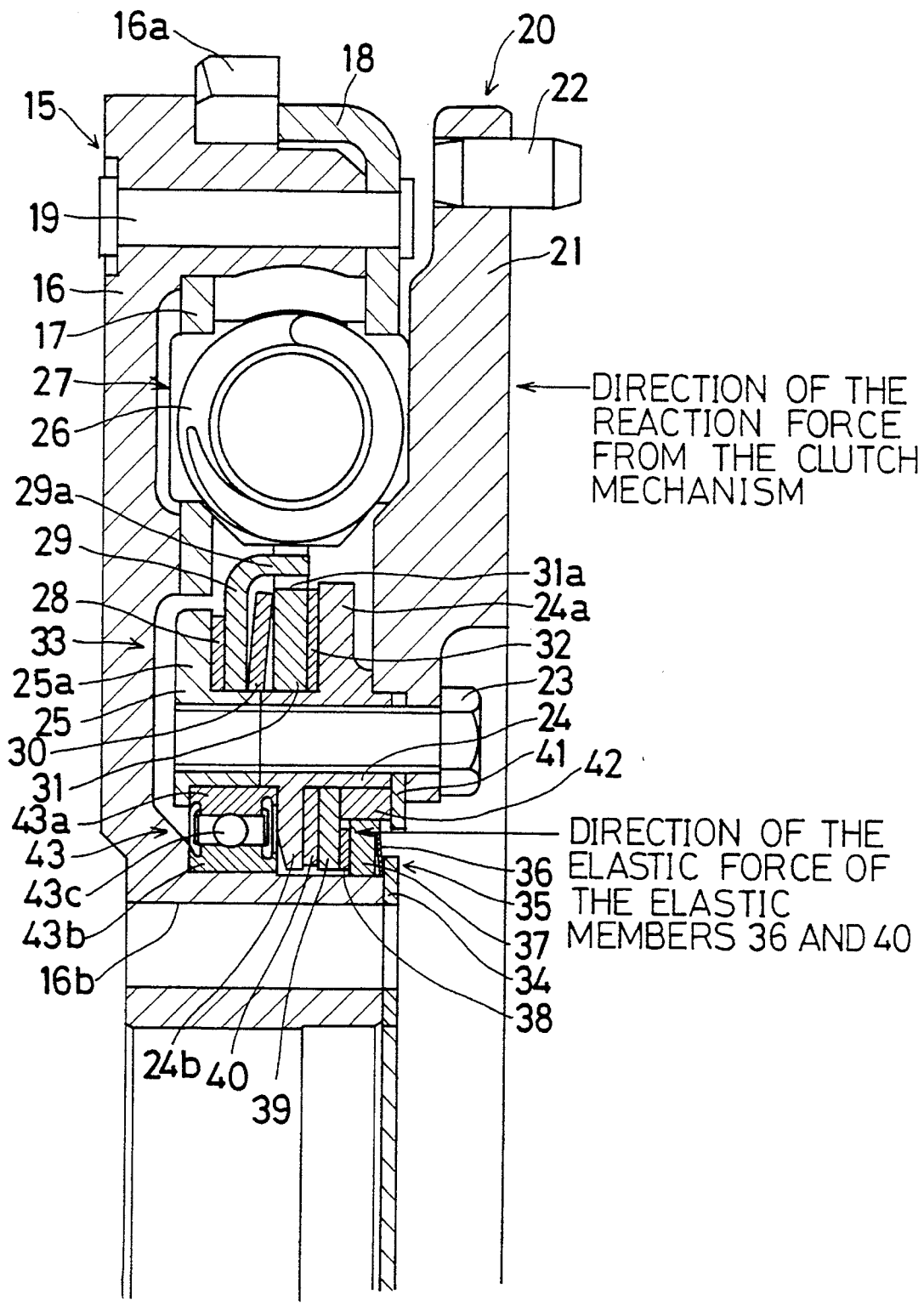
FIG. 1 is a detailed sectional view of a torque variation absorbing device of the present invention.
Figure 2:
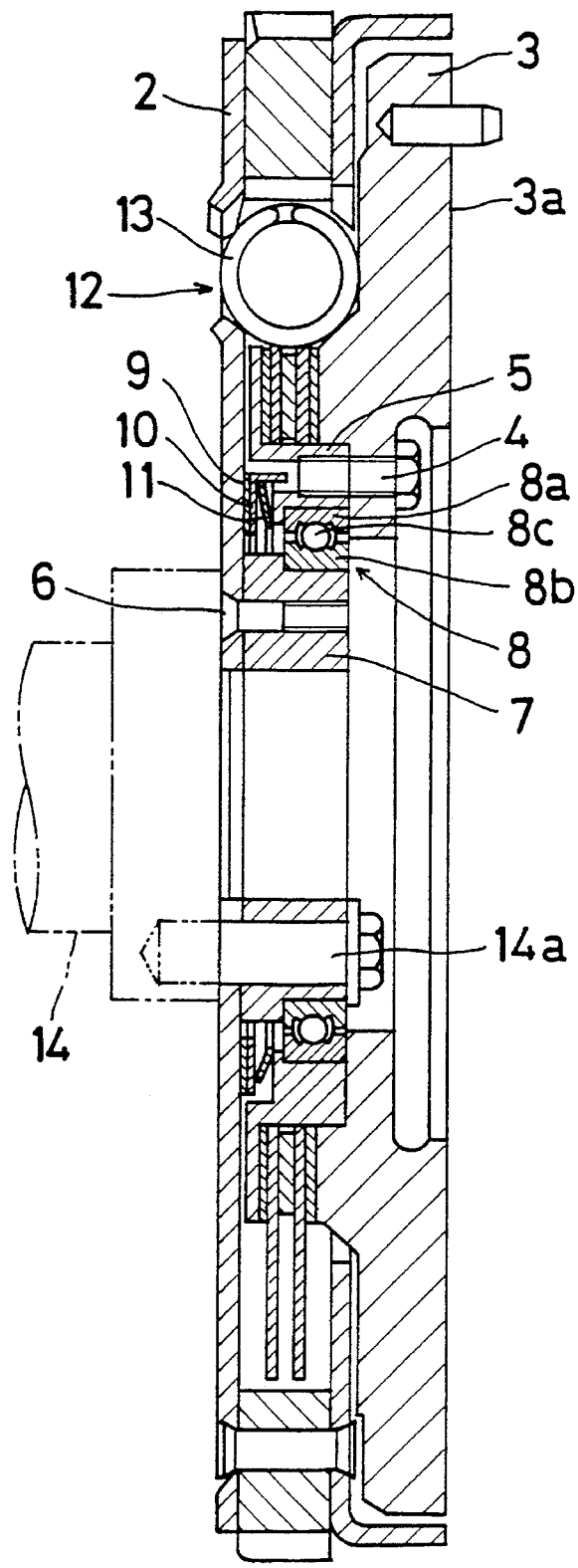
FIG. 2 is a sectional view of a torque variation absorbing device of the prior art.

Referring to FIG. 1 a torque variation absorbing device comprises a drive body 15 for connecting a crank shaft of an engine (not shown in Figure). The drive body 15 includes a drive wheel 16 and drive plates 17 and 18 which connect with the drive wheel 16 by a plurality of pins 19. The drive wheel 16 comprises a ring gear 16a engaging with a pinion gear of an engine starter. A plurality of openings 16b are used for fixing the torque variation absorbing device to the crank shaft. A flywheel 21 possesses a plurality of studs 22 used for determining a position of the clutch mechanism mounted on the flywheel 21. The flywheel 21 is fixed to a first disc 24 and a second disc 25 by a plurality of bolts 23. The flywheel 21, the first disc 24 and the second disc 25 constitute a driven body 20. At least one damping member 27 is disposed between the drive body 15 and the driven body 20. The damping member 27 includes a torsion spring 26. The first disc 24 comprises a first flange 24a and the second disc 25 comprises a first flange 25a. A friction member 28, a driven disc 29, a spring 30, a driven disc 31 and a friction member 32 constitute a torque limit mechanism 33 between the first flanges 24a and 25a. A bending portion 29a of the driven disc 29 loosely fits a groove 31a of the driven disc 31.

A hysteresis mechanism 35 is disposed between a spacer plate 34 fixed to the drive wheel 16 and a second flange 24b of the first disc 24. The hysteresis mechanism 35 includes an elastic member 36, a backing plate 37, a thrust plate 38 formed of friction material, a backing plate 39 and an elastic member 40. A friction member 42 is provided between the backing plate 39 and a plate 41. Furthermore a bearing 43 is disposed between the second flange 24b and the drive wheel 16. The bearing 43 includes an outer race 43a, an inner race 43b and a ball 43c.

The outer race 43a is pressed by the elastic force of the elastic members 36 and 40 in the direction to the left in FIG. 1 through the second flange 24b. However the inner race 43b is restricted from moving in the direction to the left in FIG. 1 at the left end which contacts the drive wheel 16, therefore the bearing 43 possesses no gap between the ball 43c and each of the outer race 43a and the inner race 43b.

When the clutch mechanism is released, the pressure plate (not shown in Figure) of the clutch mechanism is moved in the direction from the right in FIG. 1 and the flywheel 21 receives a reaction force from the clutch mechanism. However the flywheel 21 is prevented from moving in the direction of the crank shaft from the side of the clutch mechanism because the bearing 43 possesses no gap.

In the above mentioned structure the outer race is pressed in the direction of the crank shaft by the elastic force of the elastic member in the hysteresis mechanism. However the torque variation absorbing device may comprise construction as the outer race is fixed to the drive wheel and the inner race is pressed in the direction of the crank shaft by the elastic force of the elastic member.

While the invention has been particularly shown and described with reference to preferred embodiment thereof, it will be understood by those skilled in the art that the foregoing and other changes in form and details can be made therein without departing from the spirit and scope of the invention.

What is claimed is:

1. A torque variation absorbing device comprising:
    a drive body for connecting to a drive member;
    a driven body for connecting to a clutch mechanism which produces a reaction force upon release of the clutch mechanism;
    a damping mechanism disposed between the drive body and the driven body;
    a hysteresis mechanism disposed between the drive body and the driven body, the hysteresis mechanism including an elastic member which exerts an elastic force; and
    a bearing disposed between the drive body and the driven body and including an inner race and an outer race, one of the inner race and the outer race being biased relative to the other one of the inner race and the outer race in the direction of the drive body and in the same direction as the direction of the reaction force of the clutch member by the elastic force of the elastic member to minimize play between the inner race and the outer race.

2. A torque variation absorbing device as recited in claim 1, wherein the inner race is in contact with the drive body, and the outer race is in contact with the driven body and is pressed by the elastic force of the elastic member in the direction of the drive member from the side of the clutch mechanism.

3. A torque variation absorbing device as recited in claim 2, further comprising a first disc which is secured to the driven body and which includes a flange, and wherein the outer race is pressed by the elastic force of the elastic member through the flange.

4. A torque variation absorbing device as recited in claim 1, wherein the driven body includes first and second discs, said outer race being located between the first and second discs, the elastic force of said elastic member pressing against the first disc, and said inner race being in contact with the drive body.

5. A torque variation absorbing device as recited in claim 1, wherein said driven body includes a flywheel connected to a first disc, said first disc having a flange which is in contact with said one of the inner race and the outer race, said flange of the first disc being spaced from said other one of the inner race and the outer race.

6. A torque variation absorbing device according to claim 1, wherein said elastic member includes a drive member side for facing in the direction of the drive member and a clutch mechanism side for facing in the direction of the clutch mechanism, said elastic member being disposed between the drive body and the clutch mechanism side of the elastic member.

7. A torque variation absorbing device according to claim 6, wherein said elastic member exerts an elastic force on the outer race.

8. A torque variation absorbing device comprising:
    a drive body for connecting to a drive member;
    a driven body for connecting to a clutch mechanism;
    a damping mechanism disposed between the drive body and the driven body;
    a hysteresis mechanism disposed between the drive body and the driven body, the hysteresis mechanism including an elastic member which exerts an elastic force; and
    a bearing disposed between the drive body and the driven body and including an inner race and an outer race, one of the inner race and the outer race being in contact with a portion of the driven body, said one of the inner race and the outer race being biased relative to the other one of the inner race and the outer race in the direction of the drive body by the elastic force of the elastic member to minimize play between the inner race and the outer race.

9. A torque variation absorbing device according to claim 8, wherein said elastic member includes a drive member side for facing in the direction of the drive member and a clutch mechanism side for facing in the direction of the clutch mechanism, said elastic member being disposed between the drive body and the clutch mechanism side of the elastic member.

10. A torque variation absorbing device according to claim 8, wherein said elastic member exerts an elastic force on the outer race.

11. A torque variation absorbing device as recited in claim 8, wherein said driven body includes a flywheel connected to a first disc, said first disc having a flange which is in contact with said one of the inner race and the outer race, said flange of the first disc being spaced from said other one of the inner race and the outer race.

12. A torque variation absorbing device as recited in claim 8, Wherein the inner race is in contact with the drive body, and the outer race is in contact with the driven body.

13. A torque variation absorbing device as recited in claim 8, further comprising a first disc which is secured to the driven body and which includes a flange, and wherein the outer race is pressed by the elastic force of the elastic member through the flange.

* * * * *